United States Patent
Seshadri et al.

(10) Patent No.: US 8,180,907 B1
(45) Date of Patent: May 15, 2012

(54) MANAGING IPMI SESSIONS

(75) Inventors: Ramkumar Seshadri, Norcross, GA (US); Bakka Ravinder Reddy, Norcross, GA (US); Joseprabu Inbaraj, Lawrenceville, GA (US); Hari Lakshmanan Pillai, Tucker, GA (US)

(73) Assignee: American Megatrends, Inc., Norcross, GA (US)

( * ) Notice: Subject to any disclaimer, the term of this patent is extended or adjusted under 35 U.S.C. 154(b) by 33 days.

(21) Appl. No.: 12/487,909

(22) Filed: Jun. 19, 2009

(51) Int. Cl.
G06F 15/16 (2006.01)

(52) U.S. Cl. ......... 709/228; 709/224; 709/227; 709/203

(58) Field of Classification Search .......... 709/227–228, 709/224
See application file for complete search history.

(56) References Cited

U.S. PATENT DOCUMENTS

| | | | |
|---|---|---|---|
| 6,363,449 B1 * | 3/2002 | Sides et al. | 710/100 |
| 7,051,363 B2 * | 5/2006 | Cheng et al. | 726/2 |
| 7,568,222 B2 * | 7/2009 | Randle et al. | 726/4 |
| 7,844,866 B2 * | 11/2010 | Austen et al. | 714/25 |
| 2006/0212587 A1 * | 9/2006 | Barsuk | 709/228 |
| 2007/0027991 A1 * | 2/2007 | Sikdar et al. | 709/227 |
| 2007/0067834 A1 * | 3/2007 | Saito | 726/9 |
| 2007/0086449 A1 * | 4/2007 | Huang et al. | 370/389 |
| 2008/0168172 A1 * | 7/2008 | Keller et al. | 709/227 |
| 2009/0254664 A1 * | 10/2009 | Wada | 709/227 |

OTHER PUBLICATIONS

Gambit Communications, "MIMIC PIMI Simulator", Aug. 2006.*
Avocent, "Unleasing the Power of iLo, IPMI and Other Service Processors", 2007.*
Intel, "Intel Server Boards and Server Platforms Server Management Guide", Release Date Mar. 2008, http://download.intel.com/support/motherboards/server/sb/g37830001_servermanagementguide_r2_0.pdf.*
Intel, "IPMI: Intelligent Platform Management Interface Specification, Second Generation v2.0", Document Revision 1.0, Feb. 12, 2004, 590 pages.

* cited by examiner

*Primary Examiner* — Ramy M Osman
(74) *Attorney, Agent, or Firm* — Morris Manning & Martin, LLP; Tim Tingkang Xia, Esq.

(57) ABSTRACT

Technologies are described herein for managing Intelligent Platform Management Interface ("IPMI") sessions between an application module and a target IPMI device. A session abstraction layer module receives an IPMI request from the application module over a first communication link. The session abstraction layer module establishes an IPMI session with the target IPMI device over a second communication link and forwards the IPMI request to the target IPMI device via the established IPMI session. The session abstraction layer module then receives a response to the IPMI request from the target IPMI device via the established IPMI session, and forwards the response to the application module over the first communication link.

28 Claims, 4 Drawing Sheets

MANAGING IPMI SESSIONS

BACKGROUND

Application modules, such as server management modules, commonly communicate with other devices, such as servers, using the Intelligent Platform Management Interface ("IPMI") protocol. The IPMI protocol is session-based, requiring an IPMI session be established between the application module and the target IPMI device before the application module can communicate with the target IPMI device. However, in operating environments where there is a scarcity of available bandwidth, excessive network traffic caused by establishing and maintaining IPMI sessions between individual application modules and target IPMI devices may cause performance problems. In addition, since the IPMI protocol limits the number of IPMI sessions that can be established with a target IPMI device, only four application modules may communicate with a target IPMI device at any given time. This may become problematic when more than four application modules are continuously polling the target IPMI device for data.

It is with respect to these and other considerations that the disclosure made herein is presented.

SUMMARY

Technologies are described herein for managing IPMI sessions between an application module and a target IPMI device. In one embodiment, an IPMI request is received from an application module over a first communication link. When the IPMI request is received, the target IPMI device is identified and an IPMI session with the target IPMI device is established over a second communication link. After establishing the IPMI session, the IPMI request is forwarded to the target IPMI device via the established IPMI session over the second communication link. Next, a response to the IPMI request is received from the target IPMI device via the established IPMI session over the second communication link, and the response is forwarded to the requesting application module over the first communication link.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
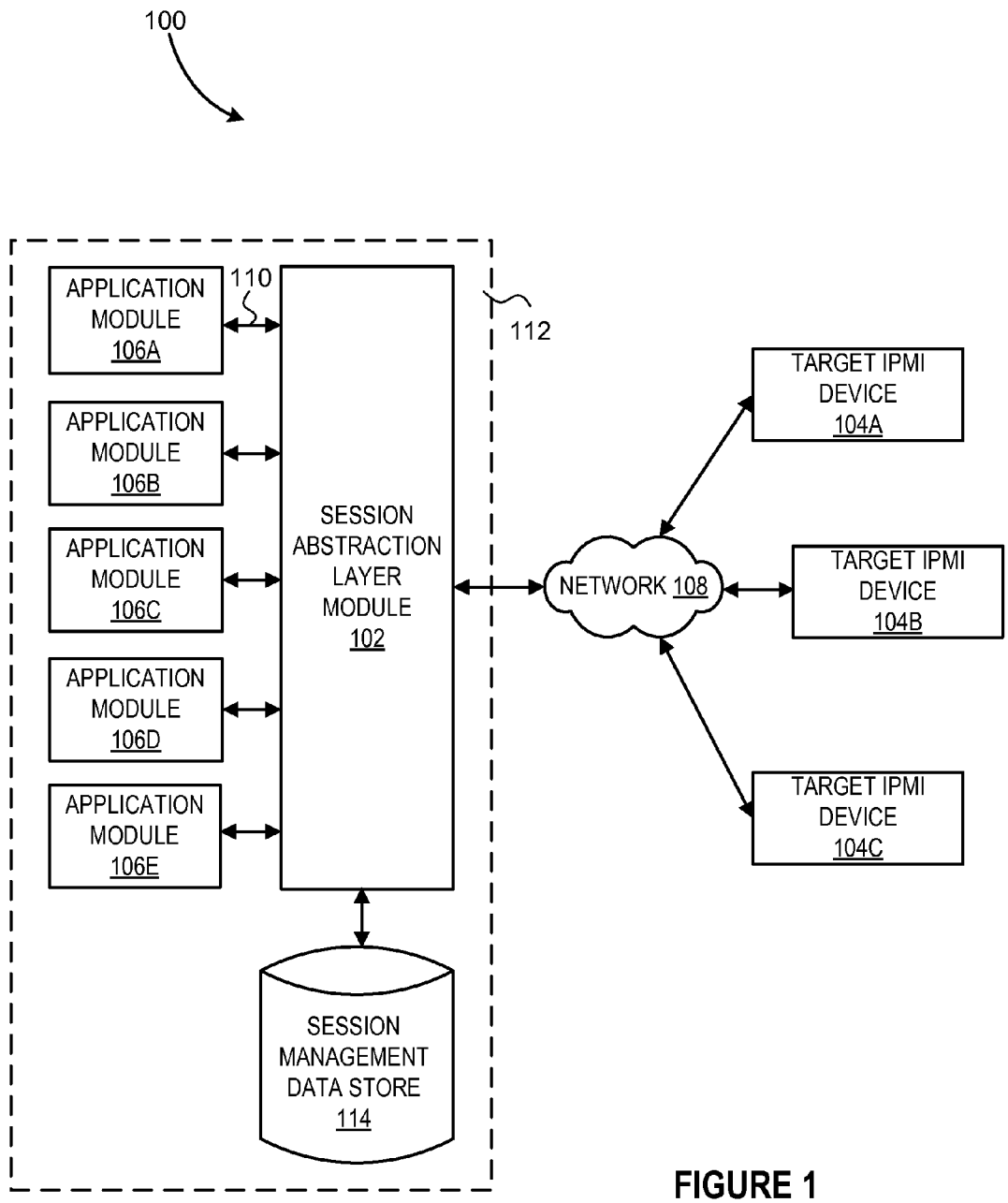
FIG. 1 is a block diagram showing an illustrative operating environment for a session abstraction layer module and other components provided in one embodiment presented herein.

The following detailed description is directed to technologies for managing IPMI sessions between application modules and target IPMI devices. Typically, the IPMI protocol may be used for server management applications, which may establish IPMI sessions with target IPMI devices to allow the application modules to communicate with the devices on a continuous basis over the established IPMI session. In various operating environments, it may be desirable to have more than four server management application modules communicating with a single target IPMI device to continuously gather instrumentation data, such as the voltage, temperature, and fan speed, from a number of target IPMI devices. However, because the IPMI protocol limits the number of IPMI sessions established with a target IPMI device, only four application modules may communicate with a single target IPMI device at any given time. Through the use of the session abstraction layer module described herein, more than four application modules may communicate with a single target IPMI device concurrently. The session abstraction layer module establishes an IPMI session with a target IPMI device, and then shares the established IPMI session across all the application modules communicating with the target IPMI device.

While the subject matter described herein is presented in the general context of program modules that execute in conjunction with the execution of an operating system and application programs on a computer system, those skilled in the art may appreciate that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. Referring now to the drawings, in which like numerals represent like elements through the several figures, aspects of a computing system and methodology for managing IPMI sessions between application modules and target IPMI devices will be described.

Turning now to FIG. 1, details will be provided regarding an illustrative operating environment 100 for the implementations presented herein, as well as aspects of several software components that provide the functionality described herein. The environment 100 includes a session abstraction layer module 102. The session abstraction layer module 102 allows application modules 106A-106E (also referred to herein as application modules 106) to communicate with target IPMI devices 104A-104C (also referred to herein as target IPMI devices 104), utilizing the IPMI protocol, without having to establish an IPMI session directly between each application module 106 and target IPMI device 104.

The session abstraction layer module 102 may be implemented in a specialized computing device 112, or it may be implemented as a software module or computer program executing on a computing system. The session abstraction layer module 102 is configured to communicate with the IPMI target devices 104 over a second communication link, such as the network 108 shown in FIG. 1. The network 108 may be a LAN, a WAN, a MAN, a fiber ring, a fiber star, wireless, optical, satellite, or any other network technology, topology, protocol, or combination thereof that allows communication between the session abstraction layer module 102 and the target IPMI devices 104. The session abstraction layer module 102 may be limited to managing only four IPMI sessions with any target IPMI device 104 at any given time. However, according to embodiments, there may be no limit to the number of target IPMI devices 104 that may communicate with the session abstraction layer module 102.

Each of the target IPMI devices 104 may be a network server, such as a web server or a data storage server, or may be any other type of computer or device that can communicate using the IPMI protocol. In a typical operating environment, the target IPMI devices 104 may be remotely located in diverse geographic locations across the network 108. In order to monitor, maintain, and repair the target IPMI devices 104, network managers may monitor these devices 104 frequently in order to timely address issues that may lead to a failure of a target IPMI device 104. Therefore, in order to maintain the target IPMI devices 104, the health of the target IPMI devices 104 may be continuously monitored by polling the IPMI devices 104 for particular data, such as temperature, voltage, fan speed, and other types of data.

Typically, the target IPMI devices 104 are monitored by application modules 106 that are configured to poll the devices on a continuous basis. The application modules 106 may be implemented as specialized computing devices, or they may be implemented as software applications on a single general purpose computer or multiple computers. In one embodiment, the application modules 106 may be located on the same computing device 112 as the session abstraction layer module 102.

The application modules 106 may include routines, programs, components, data structures, and other types of structures that perform particular tasks or implement particular abstract data types. Further, the application modules 106 may be server management application modules that are responsible for managing the IPMI devices 104 that are a part of the network 108. In various embodiments, a single application module 106 may poll only one target IPMI device 104 for a variety of data including temperature, voltage, and fan speed, or a single application module may poll many target IPMI devices for only one data value. Further, in various embodiments, any number of application modules 106 may communicate with any number of target IPMI devices 104 for collection of data, including data related to the health of the target IPMI devices or any other type of data.

According to embodiments, the application modules 106 communicate with the target IPMI devices 104 via the session abstraction layer module 102. The application modules 106 communicate with the session abstraction layer module 102 over a first communication link 110. The first communication link 110 may be a network link, an API layer, a remote process calling layer, or any other type of communication link that allows the application modules 106 to communicate with the session abstraction layer module 102. According to one embodiment, the application modules 106 communicate with the session abstraction layer module 102 over the first communication link 110 using the IPMI protocol. This may facilitate the implementation of the session abstraction layer module 102 into existing computing and network systems because the application modules 106 may be able to communicate with the session abstraction layer module as if they were communicating directly with a target IPMI device 104.

The IPMI communication between the application modules 106 and the session abstraction layer module 102 may be session-based, requiring the application modules to establish a session with the session abstraction layer module before initiating any communication with the session abstraction layer module. In another embodiment, the application modules 106 may communicate with the session abstraction layer module 102 in a sessionless fashion. In other words, the application modules may communicate with the session abstraction layer module without establishing a session prior to communicating. It will be appreciated that sessionless communication between the application modules 106 and the session abstraction layer module 102 may be advantageous, because establishing and maintaining sessions utilizes bandwidth, which may be problematic in operating environments having limited bandwidth resources. Further, sessionless communication may be faster than session-based communications because the application modules 106 and the session abstraction layer module 102 may communicate data requests and responses without having to spend additional time establishing sessions.

The session abstraction layer module 102 is connected to a session management data store 114. The session management data store 114 may store information relating to data requests sent from the application modules 106 to the session abstraction layer module 102 as well as information regarding IPMI sessions established between the session abstraction layer module 102 and the target IPMI devices 104. The session management data store 114 may be a memory area or a storage device located on the same computing device as the session abstraction layer module 102, or another storage or computing device that is located across the network.

Figure 2:
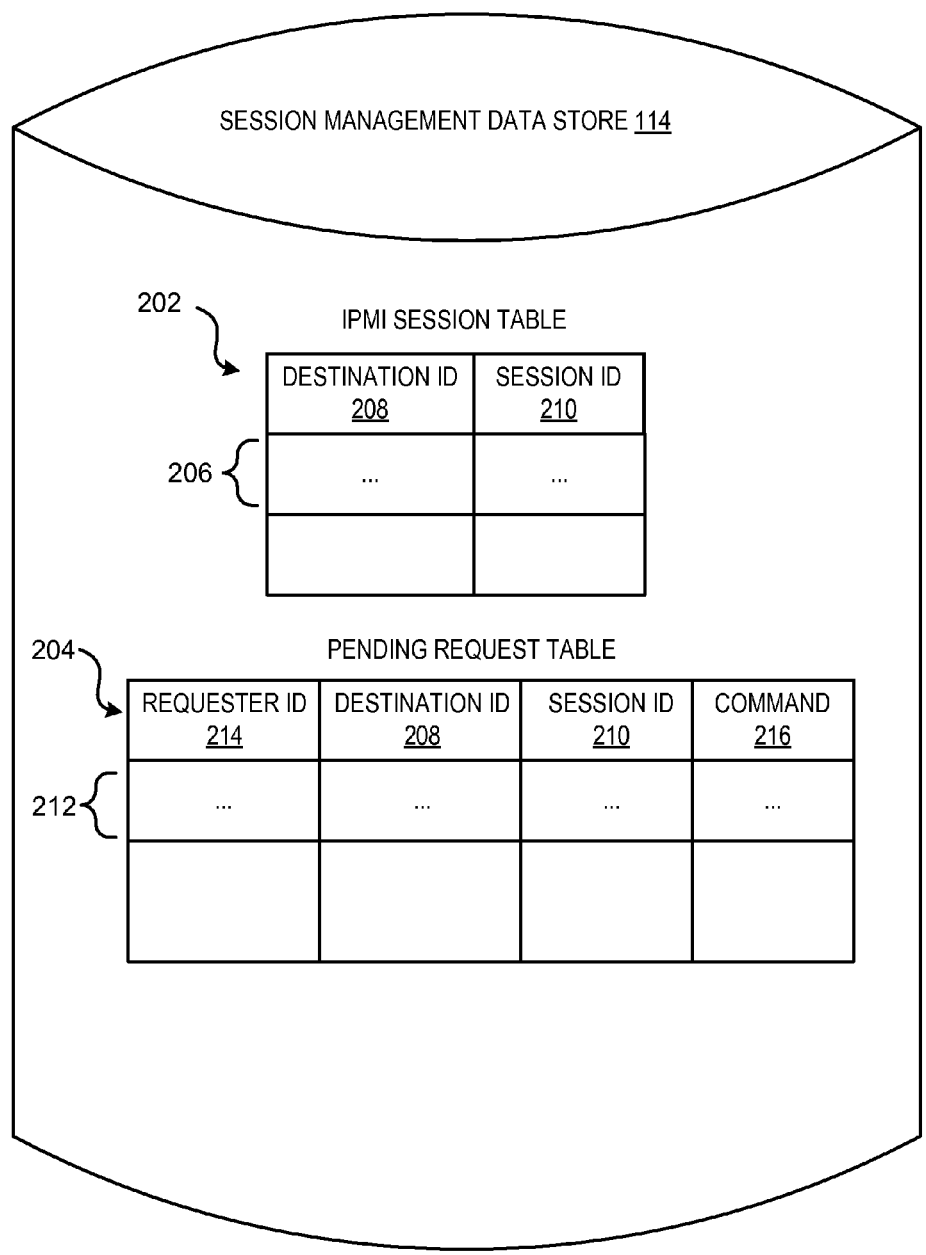
FIG. 2 is a block diagram illustrating a session management data store, according to one embodiment.

FIG. 2 provides additional details regarding the session management data store 114, which includes an IPMI session table 202 and a pending request table 204. The IPMI session table 202 is configured to store IPMI session entries 206 that include information regarding an IPMI session established between the session abstraction layer module 102 and one of the target IPMI devices 104. Each IPMI session entry 206 may include a destination identifier ("ID") 208 and a session ID 210. The destination ID 208 uniquely identifies the target IPMI device 104 and may be a network address or other identifier of the device. The session ID 210 identifies the established session between the session abstraction layer module 102 and the target IPMI device 104. The session abstraction layer module 102 may establish up to four IPMI sessions with each target IPMI device 104 at a given time, but as described above, there may be no limit to the number of application modules 106 that may communicate through the IPMI sessions established between the session abstraction layer module 102 and the target IPMI device 104.

The pending request table 204 is configured to store pending request entries 212 that include information related to each data request received from the application modules 106 connected to the session abstraction layer module 102. Each pending request entry 212 includes a requester ID 214, the destination ID 208, the session ID 210, and a command 216.

The requester ID 214 is a unique identifier that identifies the particular application module 106 that sent the IPMI request. As described above, the destination ID 208 identifies the target IPMI device 104 to which the IPMI request is being sent, and the session ID identifies the IPMI session over which the IPMI request is being sent to the target IPMI device 104. The destination ID 208 and the session ID 210 associated with the pending request entry 212 match the destination ID 208 and the session ID 210 stored in the IPMI session entry 206 associated with the IPMI session over which the IPMI request was sent. The command 216 may be an instruction that is communicated to the target IPMI device 104 to return a specific item of data, to reset a process or thread executing on the target IPMI device, or to perform some other management function. In various embodiments, the pending request entry 212 may include any number of data fields, which may or may not include any or all of the requester ID 214, destination ID 208, session ID 210, and the command 216.

Figure 3:
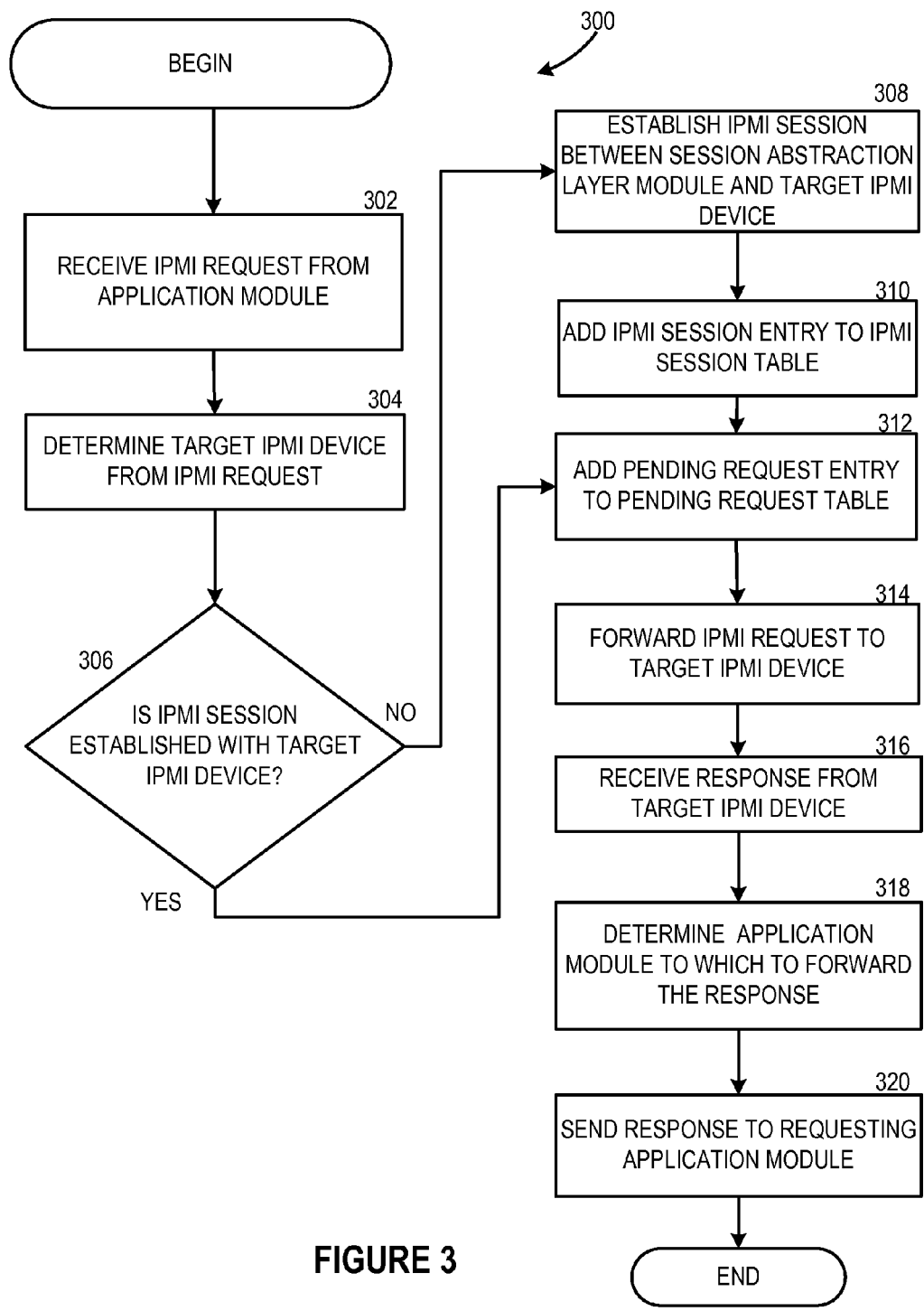
FIG. 3 is a logical flow diagram illustrating one routine for managing IPMI sessions between application modules and target IPMI devices, according to one embodiment.

Turning now to FIG. 3, additional details will be provided regarding the embodiments presented herein for managing IPMI sessions between an application module 106 and a target IPMI device 104. In particular, FIG. 3 is a logical flow diagram illustrating one routine 300 for managing IPMI sessions between application modules 106 and target IPMI devices 104, according to embodiments described herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

According to one embodiment, the routine 300 begins at operation 302, where the session abstraction layer module 102 receives an IPMI request from an application module 106 over the first communication link 110. In various embodiments, the application module 106 may send an IPMI request to the session abstraction layer module 102 as if the application module 106 were actually communicating directly with the target IPMI device 104, but without having to first establish an IPMI session with the session abstraction layer module 102. In an alternative embodiment, the application module 106 may communicate with the session abstraction layer module 102 over an IPMI session established between the module and the session abstraction layer module.

Upon receiving the IPMI request from the application module 106, the routine 300 proceeds from operation 302 to operation 304, where the session abstraction layer module 102 determines the target IPMI device 104 from the IPMI request. In various embodiments, the target IPMI device 104 is determined by retrieving the destination ID 208 from the IPMI request. As described above, the destination ID 208 uniquely identifies a particular target IPMI device 104.

From operation 304, the routine 300 proceeds to operation 306, where the session abstraction layer module 102 determines whether an IPMI session with the target IPMI device 104 has already been established. In one embodiment, the session abstraction layer module 102 searches the IPMI session table 202 for an IPMI session entry having a destination ID 206 matching that retrieved from the IPMI request. If a matching IPMI session entry 206 is found, in other words, an IPMI session has already been established with the target IPMI device 104, the routine 300 proceeds from operation 306 to operation 312, described below. However, if no matching IPMI session entry is found, in other words, no IPMI session with the target IPMI device 104 has already been established, the routine 300 proceeds from operation 306 to operation 308, where the session abstraction layer module 102 establishes an IPMI session with the target IPMI device 104 over the second communication link, such as the network 108.

The routine 300 then proceeds from operation 308 to operation 310, where the session abstraction layer module 102 adds an IPMI session entry 206 to the IPMI session table 202 corresponding to the established IPMI session. The IPMI session entry 206 includes the session ID 210 identifying the established IPMI session and the destination ID 208 identifying the target IPMI device 104 from the IPMI request. Upon adding the IPMI session entry 206 to the IPMI session table 202, the routine 300 proceeds from operation 310 to operation 312.

At operation 312, the session abstraction layer module 102 adds a new pending request entry 212 to the pending request table 204 corresponding to the IPMI request received from the application module 106. The pending request entry 212 includes the destination ID 208, the requester ID 214, and the command 216 from the IPMI request and the session ID 210 from the IPMI session table 202 corresponding to the established IPMI session between the session abstraction layer module 102 and the target IPMI device 104.

From operation 312, the routine 300 proceeds to operation 314, where the session abstraction layer module 102 forwards the IPMI request to the target IPMI device 104 via the IPMI session corresponding to the session ID 210. From operation 314, the routine 300 then proceeds to operation 316, where the session abstraction layer module 102 receives a response to the IPMI request from the target IPMI device 104 via the IPMI session.

Upon receiving the response to the IPMI request, the routine 300 proceeds to operation 318, where the session abstraction layer module 102 determines the application module 106 to which to forward the response by searching the pending request table 204 for the corresponding pending request entry 212. The session abstraction layer module 102 may determine the corresponding pending request entry 212 by matching the destination ID 208, the session ID 210, and/or the command 216 contained in the response to the pending request entry. The corresponding application module 106 may then be determined from the Requester ID 214 from the corresponding pending request entry 212. Upon determining the application module 106 to which to forward the response, the routine 300 proceeds to operation 320, where the session abstraction layer module 102 forwards the response to the application module 106 over the first communication link 110.

Figure 4:
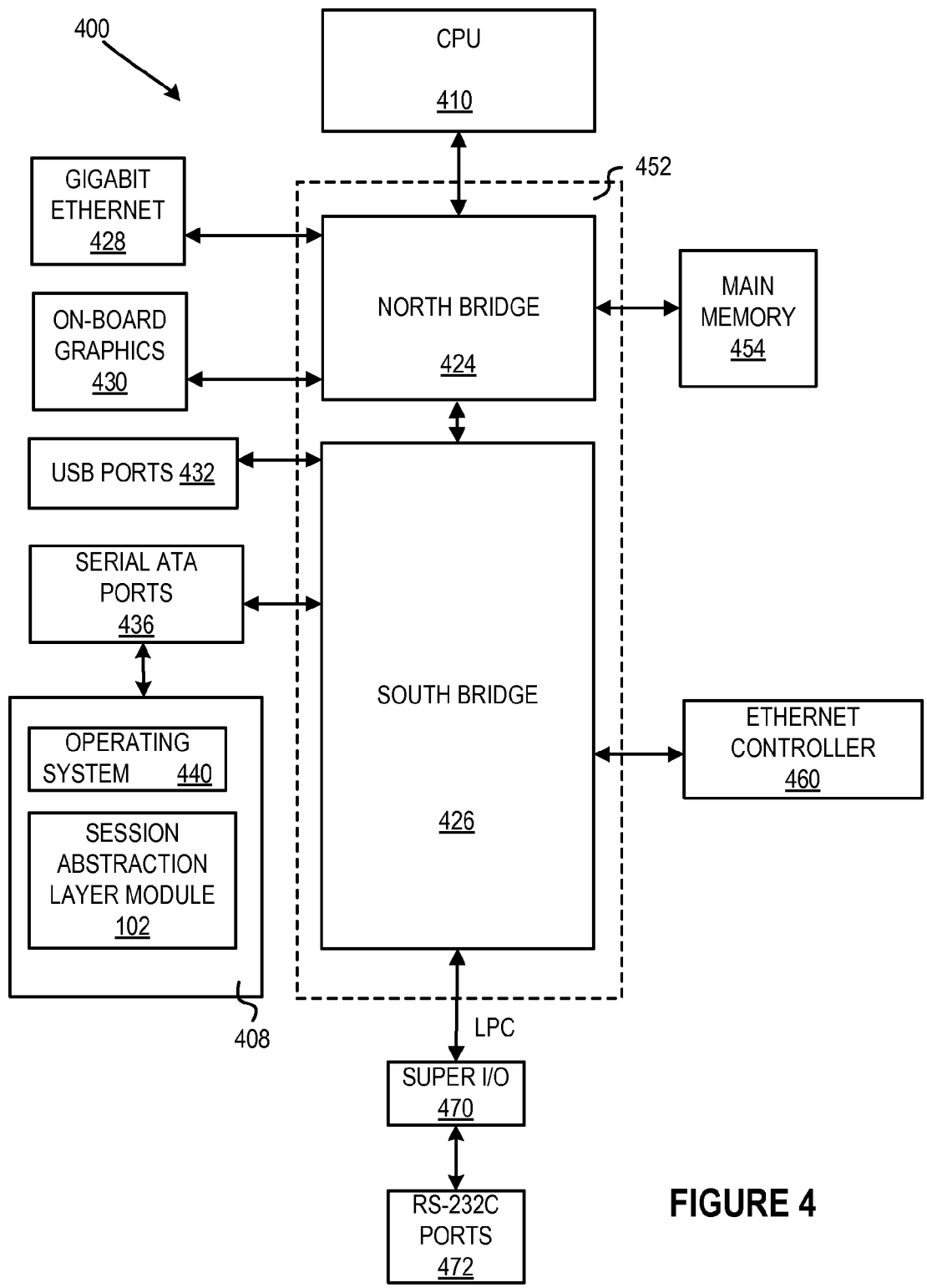
FIG. 4 is a computer architecture diagram illustrating computer hardware architectures for a computing system capable of managing IPMI sessions between application modules and target IPMI devices, according to embodiments.

FIG. 4 shows one computer architecture for a computer system 400 that may be utilized in the implementations described herein. The computer system 400 includes a baseboard, or "motherboard", which is a printed circuit board to which a multitude of components or devices may be connected by way of a system bus or other electrical communication paths. In one illustrative embodiment, a CPU 410 operates in conjunction with a chipset 452. The CPU 410 is a standard central processor that performs arithmetic and logical operations necessary for the operation of the computer system 400. Software modules stored in various storage media of the computer system 400 may, when loaded into the CPU 410 and executed, transform the CPU 410 and the overall computer system 400 from a general-purpose computing system into a special-purpose computer system customized to manage IPMI sessions between application modules 106 and target IPMI devices 104.

The CPU 410 may be constructed from any number of transistors or other discrete circuit elements, which may individually or collectively assume any number of states. More specifically, the CPU 410 may operate as a finite state machine. Further, the computer system 400 includes the session abstraction layer module 102 stored in a memory area of the computer system 400. The session abstraction layer module 102 includes the IPMI session management routine 300, which includes a series of computer-executable instructions that, when executed by the CPU 410, may transform the CPU 410 by specifying how the CPU 410 transitions between states, thereby transforming the transistors or other discrete hardware elements constituting the CPU 410.

The chipset 452 includes a north bridge 424 and a south bridge 426. The north bridge 424 provides an interface between the CPU 410 and the remainder of the computer system 400. The north bridge 424 also provides an interface to a random access memory ("RAM") used as the main memory 454 in the computer system 400 and, possibly, to an on-board graphics adapter 430. The north bridge 424 may also include functionality for providing networking functionality through a gigabit Ethernet adapter 428. The gigabit Ethernet adapter 428 is capable of connecting the computer system 400 to other computers over a network, such as the network 108 described in FIG. 1. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer system 400. In particular, the south bridge 426 may provide one or more universal serial bus ("USB") ports 432 and an Ethernet controller 460. In one embodiment, the bus comprises a peripheral component interconnect ("PCI") bus.

The south bridge 426 is also operative to provide one or more interfaces for connecting mass storage devices to the computer system 400. For instance, according to an embodiment, the south bridge 426 includes a serial advanced technology attachment ("SATA") adapter for providing one or more serial ATA ports 436 and an ATA 100 adapter for providing one or more ATA 100 ports. The serial ATA ports 436 and the ATA 100 ports may be, in turn, connected to one or more mass storage devices, such as the SATA disk drive 408 for storing an operating system 440 and application programs, such as the session abstraction layer module 102 described above in regard to FIG. 1. As known to those skilled in the art, an operating system 440 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 440 comprises the LINUX operating system. According to another embodiment of the invention, the operating system 440 comprises one of the WINDOWS® family of operating systems from MICROSOFT CORPORATION of Redmond, Wash. According to another embodiment, the operating system 440 comprises the UNIX® or SOLARIS® operating system. It should be appreciated that other operating systems may also be utilized.

The mass storage devices connected to the south bridge 426, and their associated computer-readable media, provide non-volatile storage for the computer system 400. Although the description of computer-readable media contained herein refers to a mass storage device, such as a hard disk or CD-ROM drive, it should be appreciated by those skilled in the art that computer-readable media can be any available media that can be accessed by the computer system 400. By way of example, and not limitation, computer-readable media includes volatile and non-volatile, removable and non-removable media or technology for storage of information such as computer-readable instructions, data structures, program modules or other data. Computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices.

As discussed above with respect to FIG. 4, the session abstraction layer module 102 may be stored in the SATA disk drive 408 of the computer system 400. In various embodiments, implementing software modules, such as the session abstraction layer module 102, may transform the physical structure of the storage medium, such as the SATA disk drive 408 on which the modules are stored. The specific transformation of physical structure may depend on various factors, in different implementations of this description. Examples of such factors may include, but are not limited to: the technology used to implement the storage media, whether the storage media are characterized as primary or secondary storage, and the like.

For example, the computer system 400 may store information to the SATA disk drive 408 by issuing instructions to alter the magnetic characteristics of a particular location within the drive. These transformations may also include altering the physical features or characteristics of other types of media, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The computer system 400 may further read information from the mass storage device by detecting the physical states or characteristics of one or more particular locations within the mass storage device.

A low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports.

Based on the foregoing, it should be appreciated that technologies for managing IPMI sessions between application modules 106 and target IPMI devices 104 are presented herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus for managing Intelligent Platform Management Interface ("IPMI") sessions between a plurality of application modules and a target IPMI device, the apparatus comprising:
   (a) a processor;
   (b) a memory area operatively connected to the processor; and
   (c) a session abstraction layer module stored in the memory area and communicatively connected to each one of the plurality of application modules, the session abstraction layer module configured to cause the processor to:
      (i) receive an IPMI request from one of the plurality of application modules over a first communication link, wherein the IPMI request identifies the target IPMI device, includes a unique requester ID that identifies the particular application module that sent the IPMI request, and includes at least one command to receive status data corresponding to the operational health of the target IPMI device;
      (ii) determine whether an IPMI session has been established with the target IPMI device; and
      (iii) if it is determined that an IPMI session has not been established:
         (1) establish an IPMI session with the target IPMI device over a second communication link;
         (2) share the established IPMI session across the plurality of application modules;
         (3) forward the IPMI request to the target IPMI device via the shared IPMI session over the second communication link;
         (4) receive a response to the IPMI request from the target IPMI device via the shared IPMI session over the second communication link, the response including data with a status of the operational health of the target IPMI device;
         (5) determine, based at least in part on the requester ID, which particular one of the plurality of application modules to forward the response to; and
         (6) forward the response to the particular application module over the first communication link,
         wherein the plurality of application modules comprises at least five application modules.

2. The apparatus of claim 1, further comprising a session management data store comprising an IPMI session table and a pending request table.

3. The apparatus of claim 2, wherein each IPMI session entry in the IPMI session table comprises a session ID and a destination ID.

4. The apparatus of claim 2, wherein the session abstraction layer module is further configured to cause the processor to, upon receiving an IPMI request from the application module, add a pending request entry to the pending request table.

5. The apparatus of claim 2, wherein the session abstraction layer module is further configured to cause the processor to, upon receiving the response, search the pending request table to determine the particular application module to which to forward the response.

6. The apparatus of claim 2, wherein each pending request entry in the pending request table comprises a requester ID, a destination ID, a command, and a session ID.

7. The apparatus of claim 1, wherein at least one of the plurality of application modules and the abstraction layer module communicate over a sessionless communication link.

8. The apparatus of claim 1, wherein the session abstraction layer module and at least one of the plurality of application modules execute on the same computing device.

9. The apparatus of claim 1, wherein the session abstraction layer module and at least one of the plurality of application modules execute on different computing devices.

10. The apparatus of claim 2, wherein determining whether an IPMI session has been established comprises searching the IPMI session table to determine whether an IPMI session has been established with the target IPMI device, and wherein establishing the IPMI session, if it is determined that an IPMI session has not been established, comprises adding an IPMI session entry to the IPMI session table.

11. The apparatus of claim 1, wherein the session abstraction layer module is further configured to cause the processor to enable at least two of the plurality of application modules to communicate different IPMI requests and corresponding responses with the target IPMI device simultaneously.

12. The apparatus of claim 1, wherein the status data corresponds to a continuously monitored state relating to the current operational health of the target IPMI device.

13. The apparatus of claim 12, wherein the monitored state comprises at least one of temperature, voltage, and fan speed.

14. A non-transitory storage medium having computer-executable instructions stored thereon that, when executed by a processor, cause the computer to:
   (a) receive an IPMI request from one of a plurality of application modules over a first communication link, wherein the IPMI request identifies a target IPMI device, includes a unique requester ID that identifies the particular application module that sent the IPMI request, and includes at least one command to receive status data corresponding to the operational health of the target IPMI device;
   (b) determine whether an IPMI session has been established with the target IPMI device; and
   (c) if it is determined that an IPMI session has not been established:
      (i) establish an IPMI session with the target IPMI over a second communication link;
      (ii) share the established IPMI session across the plurality of application modules;
      (iii) forward the IPMI request to the target IPMI device via the shared IPMI session over the second communication link;
      (iv) receive a response to the IPMI request from the target IPMI device via the shared IPMI session over the second communication link, the response including data with a status of the operational health of the target IPMI device;
      (v) determine, based at least in part on the requester ID, which particular one of the plurality of application modules to forward the response to; and
      (vi) forward the response to the particular application module over the first communication link,
      wherein the plurality of application modules comprises at least five application modules.

15. The non-transitory storage medium of claim 14, further comprising computer-executable instructions stored thereon that, when executed by the processor, cause the computer to, upon receiving the IPMI request from the application module, add a pending request entry to a pending request table stored in a session management data store.

16. The non-transitory storage medium of claim 15, further comprising computer-executable instructions stored thereon that, when executed by the processor, cause the computer to, upon receiving the response from the target IPMI device, search the pending request table to determine the particular application module to which to forward the response.

17. The non-transitory storage medium of claim 15, wherein each pending request entry in the pending request table comprises a requester ID, a destination ID, a command, and a session ID.

18. The non-transitory storage medium of claim 14, wherein determining whether an IPMI session has been established comprises searching an IPMI session table to determine whether an IPMI session has been established with the target IPMI device, wherein the IPMI session table is stored in an IPMI session management data store and comprises IPMI session entries, and wherein establishing the IPMI session, if it is determined that an IPMI session has not been established, comprises adding an IPMI session entry to the IPMI session table.

19. The non-transitory storage medium of claim 18, wherein each IPMI session entry in the IPMI session table comprises a session ID and a destination ID.

20. The non-transitory storage medium of claim 14, further comprising computer-executable instructions stored thereon that, when executed by a processor, cause the computer to enable at least two of the plurality of application modules to communicate different IPMI requests and corresponding responses with the target IPMI device simultaneously.

21. The non-transitory storage medium of claim 14, wherein the status data corresponds to a continuously monitored state relating to the current operational health of the target IPMI device.

22. The non-transitory storage medium of claim 21, wherein the monitored state comprises at least one of temperature, voltage, and fan speed.

23. A computer-implemented method for managing Intelligent Platform Management Interface ("IPMI") sessions between a plurality of application modules and a target IPMI device, the computer-implemented method comprising:
  (a) receiving an IPMI request from one of the plurality of application modules over a first communication link, wherein the IPMI request identifies the target IPMI device, includes a unique requester ID that identifies the particular application module that sent the IPMI request, and includes at least one command to receive status data corresponding to the operational health of the target IPMI device;
  (b) searching an IPMI session table to determine whether an IPMI session with the target IPMI device has already been established;
  (c) if it is determined that an IPMI session with the target IPMI device has not been established:
    (i) establishing an IPMI session with the target IPMI device over a second communication link;
    (ii) sharing the established IPMI session across the plurality of application modules; and
    (iii) adding an IPMI session entry to the IPMI session table corresponding to the established IPMI session;
  (d) adding a pending request entry to a pending request table corresponding to the IPMI request;
  (e) forwarding the IPMI request to the target IPMI device via the shared IPMI session over the second communication;
  (f) receiving a response to the IPMI request from the target IPMI device via the shared IPMI session over the second communication link;
  (g) determining which particular one of the plurality of application modules to forward the response to by searching the pending request table for the corresponding pending request entry; and
  (h) upon determining the particular application module to forward the response to, forwarding the response to the particular application module over the first communication link,
  wherein the plurality of application modules comprises at least five application modules.

24. The computer-implemented method of claim 23, further comprising maintaining the IPMI session with the target IPMI device until receiving a request to end the IPMI session.

25. The computer-implemented method of claim 23, wherein the IPMI session table and pending request table are stored in a session management data store.

26. The computer-implemented method of claim 23, further comprising enabling at least two of the plurality of application modules to communicate different IPMI requests and corresponding responses with the target IPMI device simultaneously.

27. The computer-implemented method of claim 23, wherein the status data corresponds to a continuously monitored state relating to the current operational health of the target IPMI device.

28. The computer-implemented method of claim 27, wherein the monitored state comprises at least one of temperature, voltage, and fan speed.

* * * * *